United States Patent [19]

Alessio

[11] Patent Number: 5,066,895
[45] Date of Patent: Nov. 19, 1991

[54] ELECTROLUMINESCENT LAMP DRIVER

[75] Inventor: David S. Alessio, West Haven, Conn.

[73] Assignee: Alrit Corporation, Prospect, Conn.

[21] Appl. No.: 424,403

[22] Filed: Oct. 20, 1989

[51] Int. Cl.[5] .......................................... H05B 37/02
[52] U.S. Cl. ................................... 315/226; 315/225; 315/283
[58] Field of Search .................. 315/209 R, 246, 224, 315/225, 226, 283, 307, DIG. 7

[56] References Cited

U.S. PATENT DOCUMENTS

| 4,042,856 | 8/1977 | Steigerwald | 315/246 |
| 4,438,372 | 3/1984 | Zuchtriegel | 315/224 |
| 4,734,624 | 3/1988 | Nagase et al. | 315/243 |
| 4,845,489 | 7/1989 | Hormel | 340/811 |

FOREIGN PATENT DOCUMENTS 1350851 11/1987 U.S.S.R. .............................. 315/246

Primary Examiner—David Mis
Attorney, Agent, or Firm—Chilton, Alix & Van Kirk

[57] ABSTRACT

A driver for a electroluminous lamp includes a bridge switching circuit comprising four MOSFETS, the lamp and a series connected inductance being connected as the load on the bridge circuit. The switching of the transistors of the bridge circuit is controlled by logic circuitry which generates a two-phase, non-overlapping gating control signal which causes the MOSFETS to be switched in pairs whereby current will flow in alternate directions through the lamp.

10 Claims, 2 Drawing Sheets

ELECTROLUMINESCENT LAMP DRIVER

BACKGROUND OF THE INVENTION

1. Field of the Invention

The present invention relates to the energization of electroluminescent lamps and particularly to the exercise of control over the voltage applied to a capacitive load, especially a light-emitting capacitor, to reliably cause the generation of light. More specifically, this invention is directed to a driver for an electroluminescent (EL) lamp and especially to an inverter circuit which provides an alternating energization voltage having a potential and frequency commensurate with the brightness and expected service life of an electroluminescent lamp. Accordingly, the general objects of the present invention are to provide novel and improved methods and apparatus of such character.

2. Description of the Prior Art

While not limited thereto in its utility, the present invention is particularly well suited for application to the field of electroluminescence. Electroluminescent lamps are increasingly gaining acceptance in various products due to their unique characteristics which include thin packaging, flexibility, modest power requirements, comparatively high visibility, long life and a high level of resistance to damage. The fields of use include backlighting of LCD displays for lap top computers, directional signs, emergency and safety lighting, advertising displays, instrument lighting, etc. An electroluminescent lamp is a light-emiting capacitor which will typically comprise an electroluminescent layer sandwiched between a pair of electrodes and separated from the electrodes by dielectric layers. At least one of the electrodes will be optically transmissive. In order to stimulate the emission of light, an electroluminescent lamp must be energized by an alternating voltage having the appropriate magnitude and frequency. The service life and brightness of an electroluminescent light are a function of both excitation voltage frequency and magnitude.

The driver, i.e., the power supply, for an electroluminescent lamp will typically comprise an inverter, the lamp being connected as a capacitive load across the output of the inverter. A suitable inverter must be reliable, be capable of volumetrically efficient packaging and characterised by a circuit design which will not to impose any economic penalties which might diminish the attractiveness of employing the electroluminescent lamp for a particular application. While numerous drivers have previously been proposed for use with electroluminescent lamps, such previously available drivers have possessed one or more inherent deficiencies. A major deficiency of prior art inverters for EL applications has been that these inverters have required the use of transformers, which are relatively expensive components characterized by large space requirements. Additionally, the prior EL drivers have been characterized by the generation of an excitation voltage which is highly dependant upon load capacitance Thus, prior art electroluminescent lamp drivers have not been suitable for volumetric efficient packaging nor have they had the capability of energizing lamps of different size or characteristics with relatively constant light output. Restated, the load capacitance dependance of the prior electroluminescent lamp drivers has resulted in the output frequency and/or the output current of the drivers varying with the particular lamp to which the driver was connected.

SUMMARY OF THE INVENTION

The present invention overcomes the above-briefly discussed and other deficiencies and disadvantages of the prior art by providing a unique method and apparatus for energizing an electroluminescent lamp. Apparatus in accordance with the invention comprises a bridge switching circuit comprising two pair of MOSFETS. The MOSFETS of each pair are connected in series between a source of high DC voltage and ground while the electroluminescent lamp is connected as the load on the bridge. A gating control signal generating circuit causes first transistors of each MOSFET pair to be gated into the conductive state during a first half cycle of the output of a timing oscillator whereas the second transistors of each MOSFET pair are gated into the conductive state during alternate half cycles of the oscillator output. Accordingly, the opposed electrodes of the electroluminescent lamp are alternately connected to the high voltage source and ground.

The gating control signal generator of a driver circuit in accordance with the invention, in the preferred embodiment, includes logic circuitry which operates on a square wave produced by a timer/oscillator to generate a two-phase, non-overlapping gating control signal which insures that there is no common "on" time for the pairs of cooperating solid state switches which apply the high DC voltage to the capacitive load. The control signal generator also provides FET gating control signals characterized by fast rise time and high current.

Also in accordance with the invention, a capacitive EL lamp load is charged through an inductance to thereby increase the effective voltage applied across the lamp above that supplied by the high voltage source.

An EL lamp driver in accordance with the present invention will additionally typically include a converter circuit for changing an applied 60 Hz AC input to a DC voltage of sufficient magnitude for use by the driver. The converter circuit will preferably include means for limiting the current available upon initial application of power to the circuit to a level which will not damage sensitive solid state circuit components.

Further in accordance with a preferred embodiment of the invention, a gating control signal generator is disabled when the current through the load being supplied by an FET switch acting under the control of the signal generator exceeds a predetermined level.

BRIEF DESCRIPTION OF THE DRAWING

The present invention may be better understood and its numerous objects and advantages will become apparent to those skilled in the art by reference to the accompanying drawing which is a schematic illustration of a first embodiment of an electroluminescent lamp driver circuit in accordance with the invention.

DESCRIPTION OF THE DISCLOSED EMBODIMENT

Figure 1A:
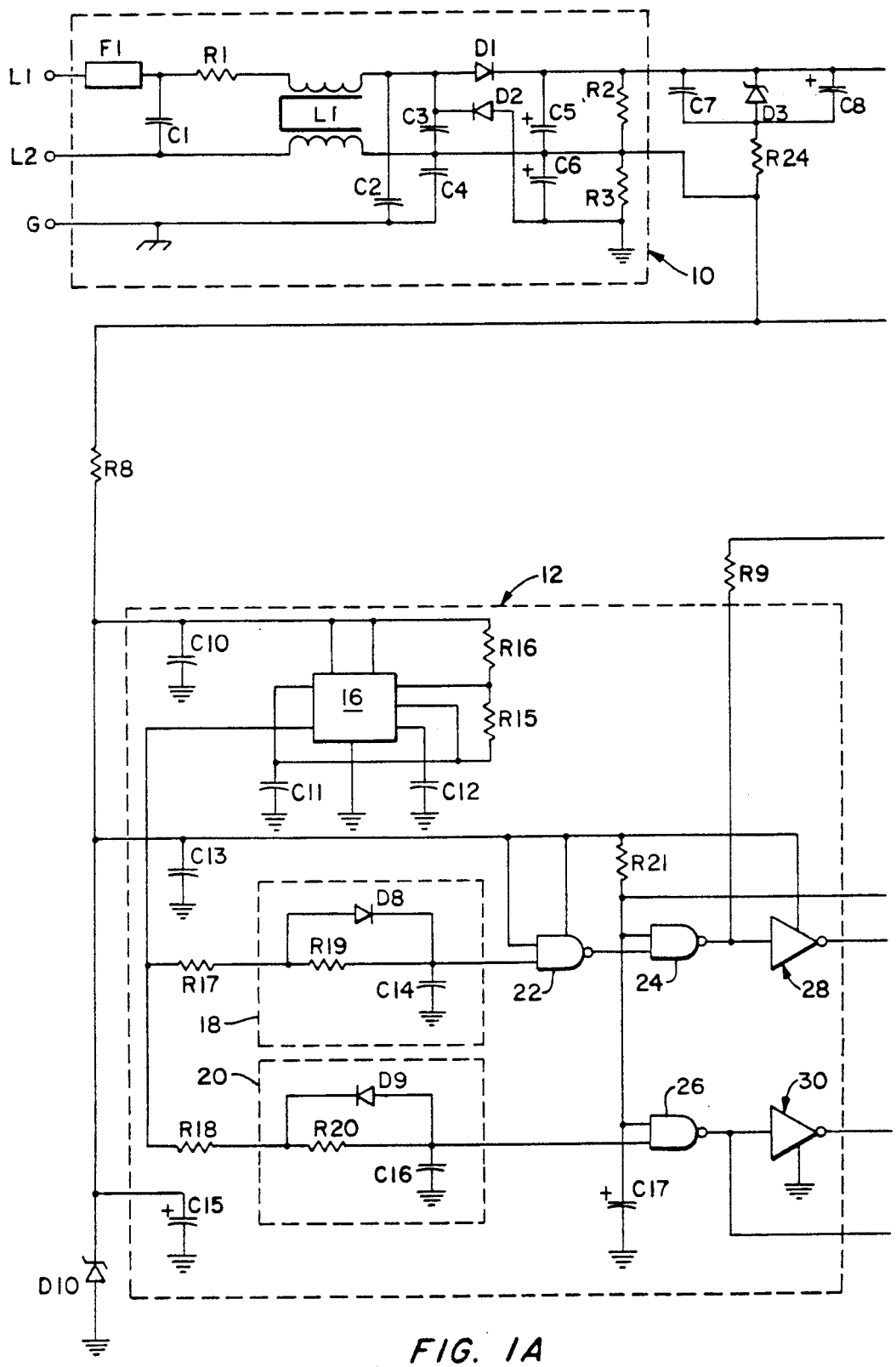
Figure 1B:
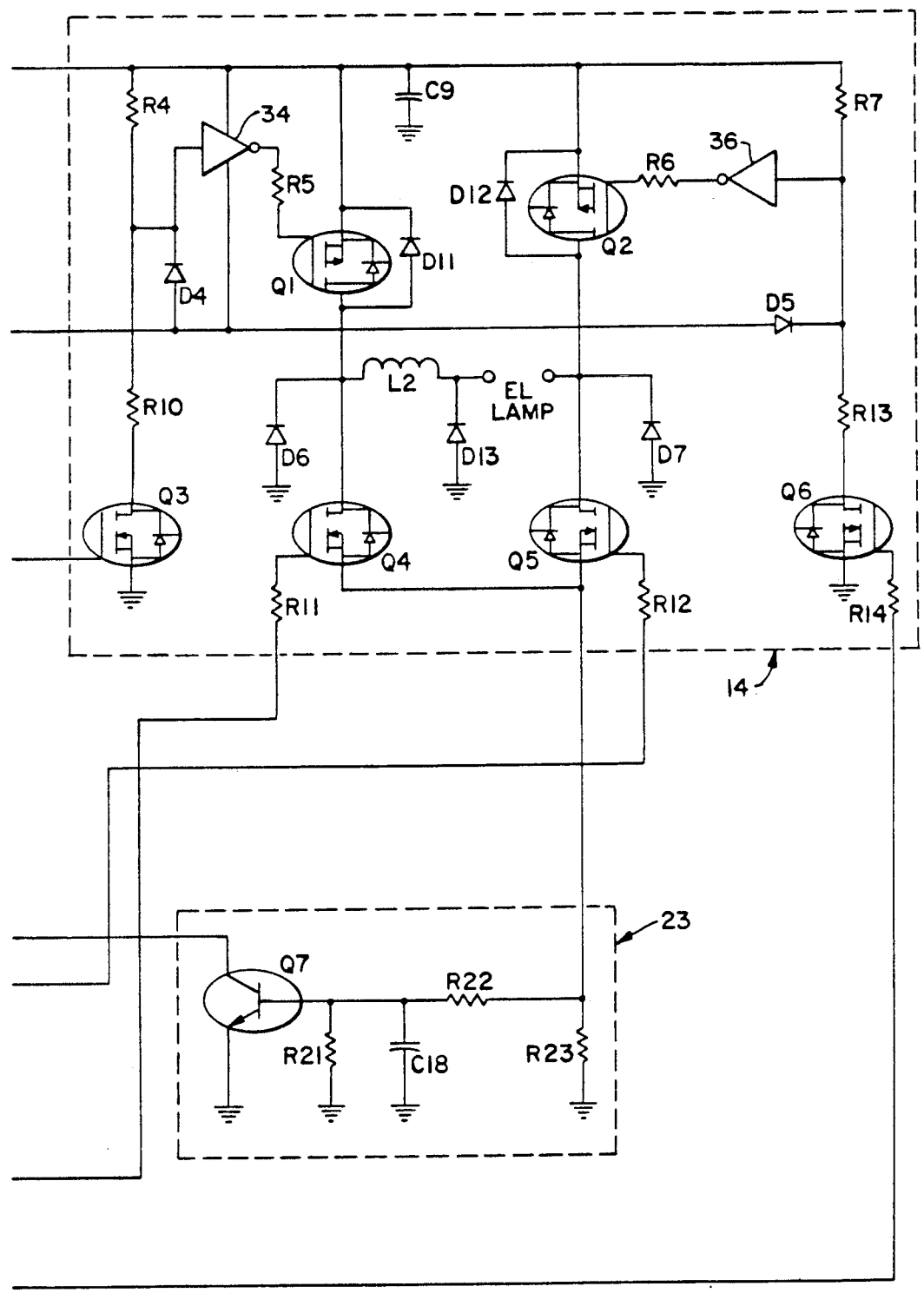

With reference now to the drawing, a driver circuit in accordance with the disclosed embodiment of the invention comprises three principle subsystems. A first subsystem, indicated generally at 10, is a converter which produces, from a standard 60 Hz, 120 VAC source, a high DC voltage. The second subsystem of the invention, indicated generally at 12, is a gating control signal generator which comprises an oscillator and logic circuitry for converting the timing pulses provided by the oscillator into gating control signals. The third subsystem of the driver circuit comprises a switching network indicated generally at 14. The electroluminescent lamp to be energized is connected as the load on the switching network. In the manner to be described below, and in response to the gating signals provided by signal generator circuit 12, the high VDC output of the converter 10 will be alternately applied to opposite electrodes of the electroluminescent lamp and, simultaneously with this switching of the high voltage, the electrode of the lamp which is not connected to the high voltage source will be connected to the circuit ground. Accordingly, the polarity of the voltage impressed across the electroluminescent lamp will alternately be switched thus stimulating, in the manner known in the art, the generation of light.

In the disclosed embodiment the high voltage generator 10 is a full-wave voltage doubler which comprises diodes D1 and D2 and capacitors C3, C4, C5 and C6. Filtering of the line voltage, prior to application to the voltage doubler, is accomplished by use of the filter network comprising capacitors C1 and C2, resistor R1 and choke L1. Resistor R1 will preferably have a negative temperature coefficient of resistance so that its resistance will decrease as it heats up during normal operation. Thus R1 limits in-rush current, which may damage active solid state circuit components, when power is initially applied to the circuit. The circuit is protected by a fuse F1 in series with one side of the line. The high DC voltage, typically on the order of 270 VDC, is developed across a voltage divider comprising resistors R2 and R3.

The high DC voltage appearing at the output of the converter 10 is filtered by capacitors C7 and C8, regulated by the series connection of Zener diode D3 and resistor R29 and delivered to the switching network 14. Converter 10 also provides the source voltage for the gating control signal generator 12. Thus, the voltage at the junction of resistors R2 and R3 is applied to a series connected current limiting resistor R8 and Zener diode D10. A filter capacitor C15 is connected in parallel with diode D10 and, accordingly, the DC voltage appearing at the junction of resistor R8 and diode D10 is substantially constant and, in the embodiment disclosed, clamped at a level of 16 VDC. This "low" regulated DC potential is applied as the supply voltage to an oscillator 16 which may, for example, comprise a CMOS LM 555 integrated circuit timer. Timer 16 is connected for astable operation and provides a square wave output signal. The frequency of this square wave is determined by the values of external resistors R15 and R16 and capacitors C11 and C12. In a typical application, the output of the timer will be a symmetrical square wave at a frequency of 400 Hz.

The output of the timer is delivered, via coupling circuits 18 and 20, to logic circuitry comprising Quad NAND gates 22, 24 and 26. Coupling circuit 18 includes forward biased diode D8, resistor R19 and capacitor C14. Coupling circuit 20 includes reverse biased diode D9, resistor R20 and capacitor C16. The function of circuits 18 and 20 is to provide a pair of 400 Hz input signals to the logic circuit which are offset in time.

The 400 Hz signal from coupling circuit 18 is delivered as a first input to NAND gate 22, the low DC supply voltage being directly applied to the second input to this gate. Gate 22 will, accordingly, function as an inverter. The output signal from gate 22 is applied as a first input to NAND gate 24. The low source voltage is normally applied to the second input of gate 24 via resistor R21. The second input of gate 24 is also connected to a load current sensor circuit 23. Resistor R21, in combination with capacitor C17, defines an RC time delay circuit which inhibits the enabling, and thus the square wave output, of gate 24 for a short time when power is initially applied to the circuit, i.e., during the time the capacitors C5 and C6 of the voltage doubler 10 are charging. The circuit comprising R21 and C17 thus assures that full power is present before the power FET's comprising the switching network begin switching.

The 400 Hz signal from coupling circuit 20 is applied as the first input to NAND gate 26 and the second input to this gate is commoned with the second input to NAND gate 24. NAND gate 26 will also function as an inverter and provides a square wave output signal which is "low" when the output of gate 24 is "high".

The signal appearing at the output of NAND gate 24 is delivered to an inverter 28. The combination of gates 22 and 24 and inverter 28 defines a Schmitt triggered inverter which effectively increases the slope of the leading edge of the timing signals provided by timer 16. Accordingly, the output of inverter 28, which functions as a first gating control signal for a solid state switch, will rapidly rise to the level where switching is assured, i.e., the inverter reduces the time the gating control voltage will reside in a voltage range where switching of the solid state switches of network 14 is uncertain.

The signal appearing at the output of gate 26 is applied as the input to an inverter 30, the gate and inverter cooperating to define a second Schmitt triggered inverter. The two Schmitt triggered inverters, in turn, cooperate to define a two-phase oscillator with non-overlapping output pulses. The purpose of the inverters 28 and 30 is to provide high drive current and fast gating signal rise time to turn the FET switches comprising the switching network 14 on fast and hard. It is desirable to turn FET's on fast to keep their operating temperature low.

The gating control signals which appear at the output of the gating control signal generator 12, i.e., the non-overlapping opposite polarity 400 Hz trigger pulses appearing at the outputs of inverters 28 and 30, function as the control inputs for switching network 14 which includes four high voltage MOSFET transistors Q1, Q2, Q4 and Q5. An electroluminescent lamp which is to be energized is connected, between output terminals 32 and 33, as a capacitive load on the bridge switching circuit. Transistors Q1 and Q2 are P-channel MOSFETS while transistors Q4 and Q5 are N-channel devices. Two additional N-channel MOSFET transistors, Q3 and Q6, are coupled, respectively via inverters 34 and 36, to the gates of the P-channel devices Q1 and Q2. Transistors Q3 and Q6 function to shift the low level switching pulses, respectively provided at the outputs of NAND gates 24 and 26, to the appropriate amplitude for operation of the P-channel MOSFETS. The inverters 34 and 36 thus perform the same function as the inverters 28 and 30. The source electrodes of N-channel MOSFET transistors Q4 and Q5 are connected to ground via a current limiting resistor R23. The voltage developed across resistor R23 is delivered, via an RC network comprising resistors R22 and R24 and capacitor C18, to the base of transistor Q7. Transistor Q7 functions as a load current limiter/sensor and, in so doing, provides short circuit protection for the switching network. If the load current rises above a preselected level, the voltage developed across R23 causes Q7 to be biased into the conductive state. The conduction of Q7 effectively grounds the second inputs to gates 24 and 26 and thereby disables the gate drive voltage for the FET's thus turning these solid state switches off. Capacitor C18 removes transients from the base of Q7 to prevent false triggering of the load current limiting action, i.e., the turning on of Q7 by a switching transient is prevented by C18. Resistor R24 precisely trims the turn-on of Q7.

In operation, the 400 Hz clock signal is, in the manner described above, converted into signals having the proper polarity and sequence to drive the "H-configuration" of power FET's so that Q1 and Q5 are turned on at the same time and Q2 and Q4 are off when Q1 and Q5 are conducting. Assuming Q1 and Q5 are conducting, the EL lamp capacitive load is charged plus/minus through a current limiting choke L2. When Q1 and Q5 turn off, Q2 and Q4 will be turned on thereby charging the EL lamp minus/plus through L2. The effect of the inductance L2 is a doubling of the voltage across the EL lamp to twice the level of the output of the voltage doubler 10.

To restate the summary of operation, during one half cycle of the 400 Hz signal provided by timer 16, through the action of the above-described gating control signal generation circuitry, transistors Q1 and Q5 will be turned on and the lamp load will be connected between the high voltage DC source and ground, transistors Q2 and Q4 being nonconductive at this time. During the alternate half cycles of the timer output, transistors Q2 and Q4 will be turned on and transistors Q1 and Q5 turned off. This will reverse the connection across the load, i.e., the high DC voltage will be applied to the lamp electrode which was previously grounded while the lamp electrode which was previously connected to the high voltage source will be grounded. The inclusion of the choke L2 in the charging current path of the capacitive load results in the doubling of the voltage applied across the lamp. The inductor L2 also increases the rise time of the current and thus reduces thermal loss in the FET switching transistors. Diodes D1 and D12, respectively connected in parallel with FET's Q1 and Q2, remove transients generated during switching and thus reduce heat generated in the FET's. Diode D13 reduces the ringing of choke L2 thus increasing the life of the EL lamp load while simultaneously removing high voltage spikes which could damage the FET's. Diodes D6 and D7 are provided between the drains of the four switching bridge MOSFETS and ground in order to avoid turn on of the internal diodes of the transistors during switching, thus enhancing the switching times.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for providing electrical power to an electroluminescent lamp load comprising:
  a source of direct current;
  four solid state switches, said switches comprising field effect transistors, said transistors being interconnected such that each comprises one leg of a bridge circuit, said bridge circuit having four node points where pairs of said legs are connected to one another;
  means connecting said current source to a pair of oppositely disposed of said node points of said bridge circuit;
  means connecting the electroluminescent lamp load between the other pair of said node points of said bridge circuit, said connecting means including an inductance connected in series with the load;
  logic circuit means for generating first and second command signal for said transistors, said first and second command signals each comprising a series of pulses, the pulses of said first and second command signals being non-overlapping;
  means responsive to a first of said command signals for simultaneously applying gating signals to the transistors comprising a first pair of oppositely disposed legs of said bridge circuit whereby said transistors of said first pair will be simultaneously switched to the conductive state and current will flow from said source through the load and said series connected inductance in a first direction; and
  means responsive to the second of said command signals for applying gating signals to the transistors comprising the second pair of oppositely disposed legs of said bridge circuit whereby current will flow from said source through the load and said series connected inductance in a second direction opposite to said first direction of current flow, the current flow in said first and second directions through said load being in synchronism with said non-overlapping command signals.

2. The apparatus of claim 1 wherein the transistors which define a first pair of adjacent legs of said bridge circuit are P-channel devices and the transistors which define a second pair of adjacent legs of said bridge circuit are N-channel type devices.

3. The apparatus of claim 2 further comprising:
  means for sensing the current delivered to the lamp load and for generating a signal commensurate therewith; and
  means responsive to said signal commensurate with load current for disabling the output of said logic circuit means when the load current exceeds a predetermined level whereby said gating signals will not be applied to said transistors.

4. The apparatus of claim 1 wherein said means for applying each comprise:
  amplifier means for providing, from each command pulse, a gating signal having a fast rise time and sufficient drive current to switch the field effect transistors to the conductive state.

5. The apparatus of claim 1 further comprising:
  means for sensing the current delivered to the lamp load and for generating a signal commensurate therewith; and
  means responsive to said signal commensurate with load current for disabling the output of said logic circuit means when the load current exceeds a predetermined level.

6. The apparatus of claim 5 wherein said means for applying each comprise:
  amplifier means for providing, from each command pulse, a gating signal having a fast rise time and sufficient drive current to switch the field effect transistors to the conductive state.

7. The apparatus of claim 6 wherein the field effect transistors which comprise a first pair of adjacent legs of said bridge circuit are P-channel devices and the field effect transistors which comprise the second pair of adjacent legs of said bridge circuit are N-channel type devices.

8. The apparatus of claim 1 wherein said direct current source comprises:
   rectifier means for converting an applied alternating current to a DC potential of sufficient magnitude to operate the electroluminescent lamp; and
wherein said logic circuit comprises:
   a pair of gate circuits, said gate circuits respectively providing said first and second command signals when enabled; and
wherein said apparatus further comprises:
   means for inhibiting said gate circuits whereby said command signals will not be generated until the DC voltage provided by said rectifier means reaches a predetermined level.

9. The apparatus of claim 6 wherein said direct current source comprises:
   rectifier means for converting an applied alternating current to a DC potential of sufficient magnitude to operate the electroluminescent lamp; and
wherein said logic circuit comprises:
   a pair of gate circuits, said gate circuits respectively providing said first and second command signals when enabled; and
wherein said apparatus further comprises:
   means for inhibiting said gate circuits whereby said command signals will not be generated until the DC voltage provided by said rectifier means reaches a predetermined level.

10. The apparatus of claim 9 wherein the field effect transistors which comprise a first pair of adjacent legs of said bridge circuit are P-channel devices and the field effect transistors which comprise the second pair of adjacent legs of said bridge circuit are N-channel type devices.

* * * * *